Nov. 17, 1970     W. E. GLENN, JR     3,540,797
HIGH RESOLUTION PROJECTION SYSTEM UTILIZING AN OUTPUT LIGHT
MASK HAVING A VARYING LIGHT TRANSMISSIVITY
Filed March 7, 1968                    2 Sheets-Sheet 1
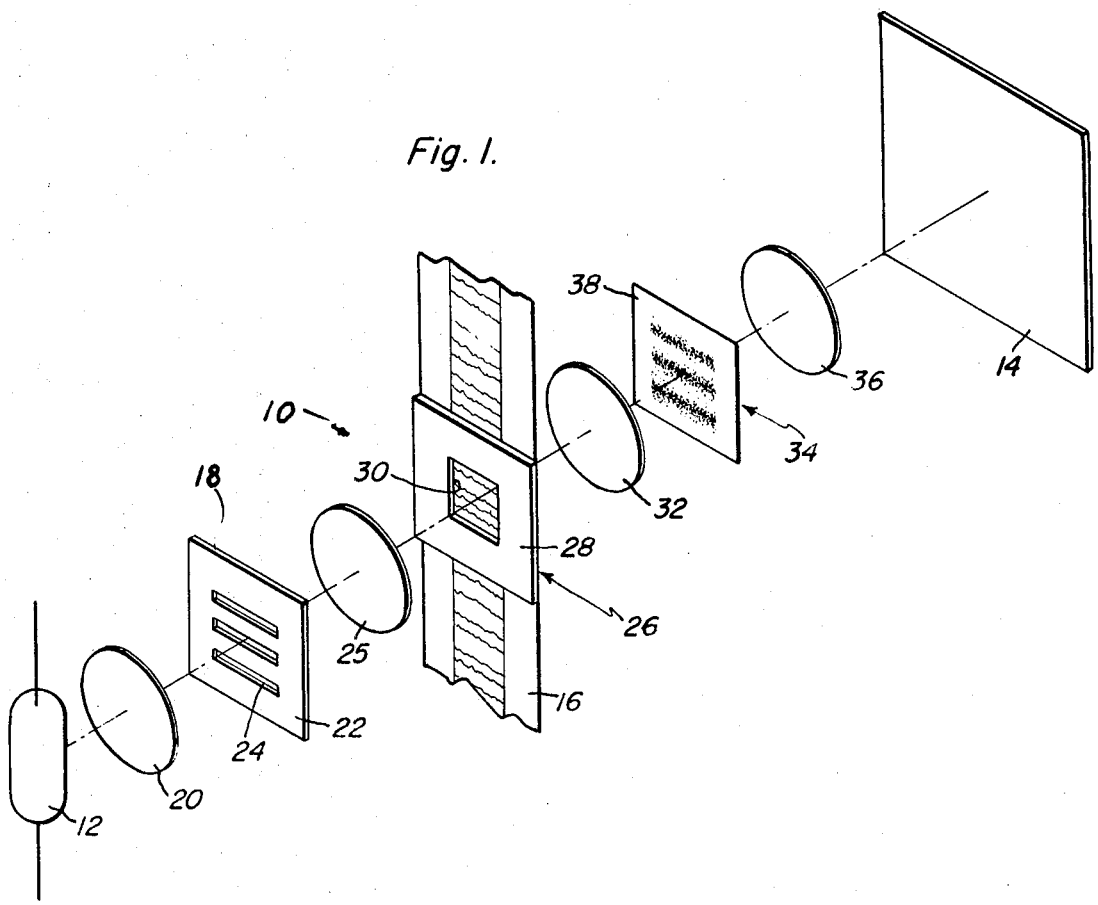
Fig. 1.
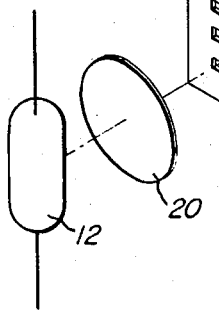
Fig. 2.
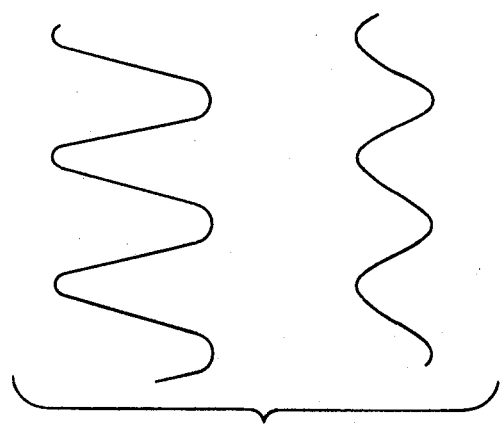
Fig. 3A.   Fig. 3B.
Fig. 3.
Inventor:
William E. Glenn, Jr.,
by John J. Kissane
His Attorney.

Inventor:
William E. Glenn, Jr.,
by John J. Kissan
His Attorney.

United States Patent Office 3,540,797
Patented Nov. 17, 1970

3,540,797
HIGH RESOLUTION PROJECTION SYSTEM UTILIZING AN OUTPUT LIGHT MASK HAVING A VARYING LIGHT TRANSMISSIVITY
William E. Glenn, Jr., Stamford, Conn., assignor to General Electric Company, a corporation of New York
Filed Mar. 7, 1968, Ser. No. 711,291
Int. Cl. G02b 27/18, 27/38
U.S. Cl. 350—162      11 Claims

ABSTRACT OF THE DISCLOSURE

Superior resolution is obtained in color displays utilizing a projection system having a polychromic light source, diffraction gratings for color modulating light passing therethrough and a selective masking element with a variable transparency distribution along the apertures passing the first order refractive light to the display screen. When the transparency of the output mask approximates $(1+\sin \theta)^2$, the first order light passed through the mask to the image plane is distributed by the output mask between only the zero order and the first order diffraction on either side of the zero order.

---

Figure 4A:
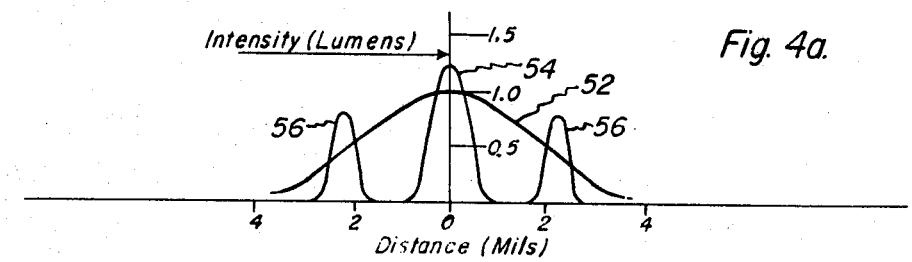

This invention relates to a high resolution color light projection system and in particular to a projection system having an output masking element with a varying light transmissivity in the direction of diffraction to reduce the harmonics produced in light passing therethrough.

Optical systems for the projection of color displays utilizing light phase (or light intensity) modulating mediums physically deformed in accordance with color components forming the display have been described and claimed in my Reissue Pat. No. 25,169, issued May 15, 1962. Because the red spectrum passed by the color projection system disclosed in my Reissue Patent tended to extend into the green region to desaturate the red coloring in the projected image, in my Pat. No. 3,044,358, issued July 17, 1962, there is described and claimed an optical system in which the width of the transparent slots in either the input or output masks of the selective masking system are enlarged for red light only (or another single color) by the extension of red filters partially into the enlarged slots. In another improved system described and claimed in my Pat. No. 3,078,338, dated Feb. 19, 1963, the physical deformation or grating pattern of the modulating medium is orthogonally arranged for red and green light to minimize interaction, or beats, between the colors and increase the permissive tolerances between slots in the output mask.

The output masks employed in prior projection systems to discriminately transmit light diffracted by the selectively deformed modulating medium, however, generally have been characterized by a plurality of strip sections completely opaque to one or more primary colors and separated from each other by sections completely transparent to the first order primary color to be passed therethrough. Because the transition in the output mask between opaque sections and transparent sections is abrupt, a diffraction is produced in the primarily monochromic first order light passing through the transparent sections of the output mask resulting in considerable light intensity in the higher orders of diffracted light and a diminution in the contrast ratio, e.g. the ratio between light intensity at a point of maximum illumination and light intensity at a point separated therefrom by a fixed distance, of the projected display. Thus while diffraction of polychromic light rays by a selectively deformed modulating medium is required to produce the required color display, the diffraction produced by the output mask results in an undesired loss in the resolution and/or contrast ratio of the display.

It is therefore an object of this invention to provide a color projection system having superior resolution.

It is also an object of this invention to provide a color projection system having a minimum loss in contrast due to light diffraction at the output mask.

It is a further object of this invention to provide a novel light mask producing reduced light intensity in the higher orders of light passed therethrough.

These and other objects of this invention are obtained by the utilization of an output light mask having a plurality of sections completely opaque to light of at least one primary color and a plurality of sections having a varying transparency to the primary color disposed intermediate the opaque sections. The sections of varying transparency exhibit an opaqueness to the primary color passing therethrough which opaqueness varies with linear distance from the opaque sections to preferably produce only zero and first order diffraction in light of the primary color. Thus the projection system of this invention is characterized by a light source for projecting a plurality of polychromic light beams through a light modulating medium having diffraction gratings with parameters, particularly gratings having different spacing corresponding to different colors and amplitudes corresponding to the intensities of the respective colors, and a masking system for the selective passage of diffracted light to produce a color image on a light receiving surface. The light modulating medium diffracts the polychromic light passing therethrough and the diffracted light is cast upon an output filter element having a transparency distribution relative to the primary colors passing through the mask which distribution varies along a direction corresponding to the direction of diffraction produced in the light passing through the light modulating medium. When the light transmissivity of the output mask varies in accordance with the formula $(1+\sin \theta)^2$, only zero and first order diffraction is produced in the light beams passing through the output light filter or mask.

Figures 4, 4B:
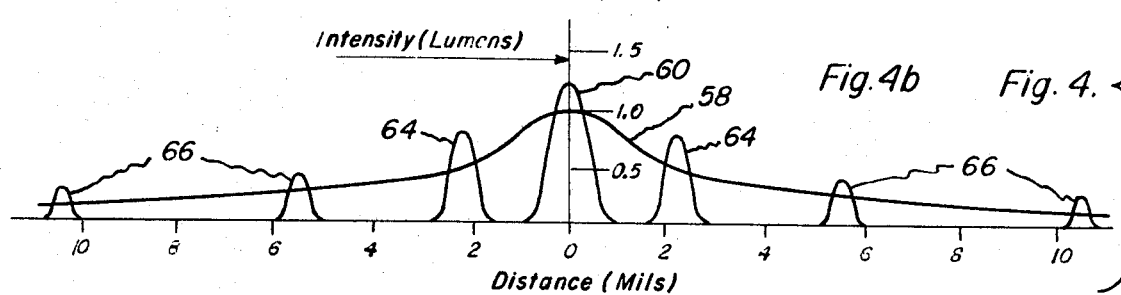

The novel features believed characteristic of the invention are set forth in the appended claims. The invention itself, together with further objects and advantages thereof may best be understood by reference to the following description, taken in connection with the accompanying drawings, in which:

FIG. 1 is an isometric view of a high resolution projection system in accordance with this invention, FIG. 2 is a sectional view depicting the output bar mask of the projection system of FIG. 1, FIG. 3 is a graph of the transmission and amplitude transmission of the light mask of FIG. 2, FIG. 4 is a portrayal of the light intensity distribution produced by the light mask of this invention relative to light masks of the prior art.

Figure 5:
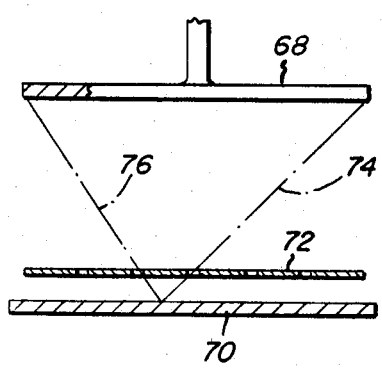
Figure 6:
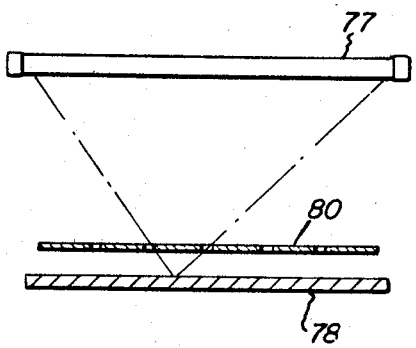
Figure 7:
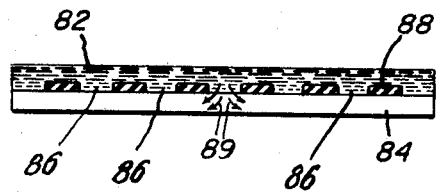

FIG. 5 is a simplified sectional view depicting apparatus suitable for forming the mask of this invention, FIG. 6 is a simplified sectional view of an alternate technique for producing a light mask in accordance with this invention, and FIG. 7 is a sectional view depicting another method of producing a light mask in accordance with this invention.

A superior resolution color projection system 10 in accordance with this invention is depicted in FIG. 1 and generally includes a source of polychromic light 12 for the visual display on screen 14 of color information written onto a light modulating medium 16 by a suitable physical deformation of the medium. Medium 16 may be a thermoplastic coated tape in which diffraction gratings have been impressed by, for example, the invention described and claimed in my Pat. No. 3,113,179, issued Dec. 3, 1963, e.g. by the deposition of a charge pattern corresponding to the color information by the utilization of a scanning electron beam. When the thermoplastic coating subsequently is heated in a vacuum environment, the charge pattern produces deformations, or gratings, in the thermoplastic corresponding to the color information. Suitable means (not shown) are provided to sequentially register the various frames of the light modulating medium with the optical path of light source 12 in a manner similar to the registration of film frames with the light source in a movie projector.

Light from source 12 is disected into a plurality of generally parallel beams by a light mask 18 upon which mask light from source 12 is cast by lens 20. Input light mask can be of conventional construction and is depicted as being formed of a plurality of opaque bars 22 separated by transparent slots 24 through which light is readily transmitted. The parallel light beams passing through mask 18 are incident upon light modulating medium 16 only over the area of a single frame to which the light beams are limited by lens 25 and a second light mask 26 having an opaque body 28 and a rectangular aperture 30. Light beams passing through the light modulating medium are diffracted therein by the diffraction gratings of the medium and are cast by a lens system 32 toward an output light mask 34 which light mask intercepts selected portions of the incident light beam dependent on the degree of diffraction of the light beams produced by medium 16. Light passing through output light mask 34 then is focused by lens 36 upon screen 14 to provide a pictorial color display corresponding to the parameters (e.g. amplitude and wavelength for phase diffraction gratings) written into the modulating medium. A more complete understanding of projection systems of this general type can be obtained by reference to my Pat. No. 3,291,903, issued Dec. 13, 1966 or my previously cited Reissue Pat. No. 25,168.

Output light mask 34 is characterized by a transparency distribution for at least one primary color to be passed by the mask which distribution varies along the direction of diffraction produced in light passing through the gratings of light modulating medium 16 and may be of the type depicted in the enlarged sectional view of FIG. 2 wherein an optically transparent glass 38 functions as a substrate holder for the opaque portions 40 of the mask. The opaque portions of the mask preferably are metallic, e.g. a sputter deposited chromium film, to safely absorb heat energy from light rays impinging thereon although other materials such as paint also can serve to form the opaque portions of the mask when heat is not a critical problem. Generally, the output mask has a plurality of spaced apart sections 42 which are completely opaque to light of at least one primary color and extend across the light mask in a direction orthogonal to the direction of diffraction produced in light rays of the primary color for which the section is opaque by the corresponding diffraction gratings in light modulating medium 16. Sections 42 may be of line width or may be substantially wider to cover approximately 30 percent of the mask surface.

The portion of the mask intermediate the opaque sections exhibits a transparency distribution varying in proportion to a continuous geometric function symmetrically disposed relative to a plane orthogonal to the plane of the mask and centrally positioned intermediate opaque sections 42. Thus, the mask may be described as having a plurality of sections 42 completely opaque to at least one primary color and extending in a direction orthogonal to the direction of diffraction of light of the primary color by modulating medium 16 with a plurality of sections 43 transparent to the primary color being disposed intermediate the opaque sections and exhibiting a transparency to the primary color which varies with linear distance from the opaque sections.

A preferred transmissivity for the output mask is shown geometrically in FIG. 3A and generally can be characterized by the formula $(1+\sin\theta)^2$. Utilizing a light mask transmissivity of this character, the first order light of the desired primary color passed through the mask exhibits a light distribution upon screen 14 having only zero order and first order diffraction on either side of the zero order light. The amplitude transmission of light passing through the screen then can be characterized as varying as $1+\sin\theta$, as shown geometrically in FIG. 3B, and the mask exhibits a transparency of at least 50 percent over at least 33 percent of its surface.

Utilizing an output mask having a transparency varying in accordance with the formula $(1+\sin\theta)^2$, when there are no diffraction gratings in the illuminated frame of light modulating medium 16 corresponding to the primary color to be passed by transparent sections 43 of the mask, lens system 32 focuses the light beams passing through the medium upon the most opaque portions of the output mask and ideally (if the light beams were a perfect line) no light is passed to screen 14. However, if there are diffraction gratings in the illuminated frame, the colors corresponding to the diffraction grating parameters (e.g. amplitude and wavelength for phase diffraction gratings) are diffracted by such an amount that first order light of the desired color ideally is transmitted through the completely transparent portions of mask 34 centrally positioned between opaque sections 42. With three diffraction gratings in light modulating medium 16 having parameters corresponding to the red, blue and green primary colors, the first order diffracted red, green and blue light in the plurality of polychromic beams is transmitted through the mask. The light then is focused by lens system 36 upon screen 14 with the three colors superimposed to produce a full color image. Although some diffraction is produced by the mask in the primary first order light passing therethrough, the light intensity distribution in the image plane is entirely in the zero order of light passed therethrough and the first order diffraction on either side of the zero order, e.g. zero order relative to the mask diffraction only. Thus the light distribution produced by the mask is the zero and first orders of light passing through the transparent sections of the mask e.g. the zero and first orders of primary first order diffracted light of a selected color emerging from light modulating medium 16.

The desired location of the transparent and opaque portions of output mask 34 to selectively transmit diffracted light rays to an image plane has been explained in detail in my heretofore mentioned patents, particularly Reissue Pat. No. 25,169 and Pat. Nos. 3,078,338 and 3,044,358, and will be applied with particularity to the $(1+\sin\theta)^2$ mask depicted in FIG. 2 to exemplify the application of these principles to masks having a varying transmissivity in the direction of diffraction produced in light beams of a desired color by modulating medium 16. The linear span of one half period of the varying transmissivity mask is derivable in accordance with the formula $$\frac{N\lambda}{S}=\frac{I}{D}$$

wherein N is the order of the diffraction and is one (first order diffraction) for the color projection system in FIG. 1, $\lambda$ is the wavelength of the light under consideration, S is the spacing (or wavelength) of the diffraction grating on the light modulating medium for the desired color to be passed, D is the distance from the light modulating medium to the output mask, and I is the distance from the zero order to the location of the Nth order diffracted light having a wavelength of $\lambda$. Thus, if a green beam having a center wavelength of 5250 A. were desired to be transmitted through the output mask, substitution of this value into the diffraction equation provides a linear measurement of one-half the period of the geometric function representative of the transmissivity of the output mask, e.g. a linear measurement of the distance I between a point of maximum transmission (green transparent spot 46) and a point of minimum transmission (green opaque spot 48). The output light mask is aligned optically with slots 24 of the input light mask so that light beams passing undiffracted through light modulating medium 16 impinge upon the maximum opaque spots 48 of the output mask.

The light intensity distribution 52 produced in light by diffraction as the light passes through an output light mask 34 having a transmissivity of $(1+\sin \theta)^2$ is depicted in FIG. 4A and includes the zero order 54 and the two first orders 56 on either side of the zero order. The light intensity distribution 58 produced in first order light passing through a conventional bar and slot light mask (as described in my prior mentioned Reissue Pat. No. 25,169) for monochromic light rays generally is depicted in FIG. 4B and includes not only the zero order 60 and first orders 64 of the monochromic light beam passing therethrough but also many of the higher orders (identified generally by reference numeral 66) in a substantial magnitude of intensity even though of much less intensity than the first order. From a comparison of the light intensity produced by the respective light masks, it can be noted that the linear distance at which the contrast is 10 to 1 for the $(1+\sin \theta)^2$ light mask is 3.5 times less than that of the conventional bar and slot light masks. Thus, approximately 3.5 times better resolution is obtained with the output light mask of this invention for a given contrast ratio than is obtained from bar and slot mask of usual design. The $(1+\sin \theta)^2$ mask also was found to have a half power point approximately identical to the half power point of a 33 percent transparent bar and slot mask.

It is to be appreciated that while prior art bar and slot output light masks are related to the physical deformations of the diffraction gratings to permit undiminished passage of the entire first order light of a desired color, almost all diffracted first order light of the desired color is diminished to some extent as the light passes through the varying transmission mask of this invention. Thus in a bar system having a perfect $(1+\sin \theta)^2$ transmission, only the centermost wavelength of the first order color passes undiminished through the mask. However, the limited diffraction produced by the $(1+\sin \theta)^2$ mask compensates somewhat for the reduced transmission through the screen while substantially increasing the contrast ratio of the displayed image.

Because in a practical system input light mask 18 produces light beams having a width in the order of approximately 18 mils, for example, rather than true line light beams, when no diffraction is produced by the diffraction gratings of light modulating medium 16, the plurality of beams produced by light mask 18 are not focused by lens system 32 upon completely opaque sections of an output light mask having a transmissivity varying as $(1+\sin \theta)^2$. To assure a complete blocking of undiffracted light beams by the output mask, the most opaque sections of the mask preferably are made totally opaque over approximately 30 percent of the entire mask to assure complete absorption by the output mask of zero order light exiting from light modulating medium 16. Although the selective darkening of the output light mask varies the transmissivity of the screen from the desired formula $(1+\sin \theta)^2$, a gradual tapering of the transmissivity of the screen occurs at the edges of the completely opaque sections and the light intensity distribution in the higher orders of light in the image plane is relatively small compared to a conventional bar and slot mask.

When an output light mask characterized by sections of variable transmissivity for each primary color component passing therethrough is employed as the output light mask in a color projection system, it is often desirable to employ an input light mask having the negative transmissivity of the output mask. Utilization of an input light mask having an opaqueness varying in accordance with the formula $(1+\sin \theta)^2$ generally permits a maximum interrelationship between the input and output light masks and results in greater light efficiency for the projection system.

Apparatus suitable for the construction of a varying transmissivity light mask is depicted in FIG. 5 and generally includes an elongated metallic, e.g. chromium, cathode 68, a glass substrate 70, and a slotted mask 72 overlying and spaced apart from the substrate. The span between mask 72 and glass substrate 70 is fixed relative to the width of the bars forming the slotted mask and the furthest extension of the cathode so that sputtered metal from the cathode deposits on the entire surface of the glass substrate except for a single point underlying each bar. To effect this result, a line 74 drawn from one edge of the cathode to the mask center bar edge proximate the cathode edge from which the line originated intersects the substrate at a location separated by a distance of a point from the intersection with the substrate of a line 76 from the opposite edge of the cathode and passing through the opposite edge of the center bar. The light mask is then formed by sputtering chromium from the cathode and depositing the chromium on the substrate.

The sputtering interval is regulated relative to the applied potential and the gaseous pressure within the sputtering chamber to deposit the film for an interval sufficient to completely opaque only the portion of the substrate underlying the slots forming mask 72. An opaqueing of 30 percent of the sputter deposited light mask at the most opaque portions of the mask then can be accomplished by subsequently superimposing an opaque bar system upon the $(1+\sin \theta)^2$ deposited bar system. It is also possible to deposit a 30 percent completely opaque varying transmissivity light mask by the utilization of a 30 percent open deposition mask which mask is empirically positioned relative to the substrate to provide a narrow, completely transparent section of approximately line width centrally positioned between the opaque areas underlying the deposition mask slots. It will be realized that metal evaporation for deposition through a slotted mask also can be effectuated by other known suitable methods, e.g. thermal heating of a chromium-source at reduced pressures without the application of an electric potential to the source.

Chromium generally is preferred as the light mask material because thin films, e.g. 1 micron or less, of chromium are characterized by a neutral density and present an equally opaque appearance to light rays of all colors while other materials, such as aluminum and gold, often appear bluish rather than opaque when deposited in very thin films.

While a sputter deposited metallic mask is preferred because of the greater tolerance of metal to heat generated during the projection of a color display, suitable light masks also may be fabricated by photographic methods such as are shown in the simplified drawing of FIG. 6, wherein an elongated light source 77 is employed to selectively expose a portion of film 78, e.g. Spectroscopic film sold by the Eastman Kodak Corp., through a slot and bar mask 80 similar in construction to the deposition mask employed in the sputtering process of FIG. 5. In the photographic method, mask 80 is situated relative to the underlying photographic film so that approximately 30 percent of the film, e.g. a portion of the film underlying the bars of mask 80, is shielded completely from impingement of light rays from elongated source 77. The slots in mask 80 are quite narrow, e.g. .01 mm., to assure only a narrow portion of the underlying film is completely exposed by light rays from source 77 while the exposure of the film intermediate the completely exposed portion directly underlying the slots of mask 80 and the 30 percent unexposed portion of the film centrally positioned underlying the bars of the mask gradually tapers with distance from the completely exposed portion of the film. Upon subsequent development of film 78, a negative is produced characterized by a variable light transmissivity situated between completely opaque sections. Thirty percent of the negative is completely opaque stripes with the area intermediate adjacent opaque stripes gradually increasing in transmissivity with distance from the opaque stripes and becoming completely transparent for the colors to be passed by the mask at a central location between the opaque sections.

A particularly suitable method for forming a light mask having a sinusoidal distribution is depicted in FIG. 7 wherein an ink 82, e.g. such as is included in the Kodak Matrix Dye Set for practicing the Kodak Dye Transfer Process, is applied to a photographic film gelatin 84 through slots 86 in an RTV rubber mask 88 passed against the face of the photographic film gelatin. A suitable acid, e.g. acetic acid, can be added to the ink in sufficient quantities to enhance the diffusion rate of the ink into the gelatin to a desired speed. As the ink seeps into the gelatin, the ink tends to concentrate most densely directly under slots 86 and distributes in a gradually tapering manner (as shown by arrows 89) into the portion of the gelatin underlying the bars of the rubber mask. Upon removal of the mask from the gelatin surface (after an empirically determined period), an ink dyed gelatin film is obtained having a transmissivity varying approximately in accordance with the formula $(1+\sin \theta)^2$.

Although the mask of this invention has been specifically described as having a bar system extending in a single direction and preferably being metallic (and therefore opaque to all primary colors), it is to be realized that the varying transmissivity mask contemplated by this invention can also be employed in systems such as are described in my previously mentioned Pat. No. 3,291,903 wherein one primary color, e.g. green, is diffracted in a direction orthogonal to the diffraction direction produced in the other primary colors, e.g. red and blue. The output mask in such a device would then consist of a plurality of strips extending in a first direction which strips may be completely opaque and varingly transparent to green light only, e.g. strips having a transmissivity of $(1+\sin \theta)^2$ for green light along its length. The filter sections for magenta would then be characterized by strips having a transmissivity of $(1+\sin \theta)^2$ to magenta light and extending in a direction orthogonal to the direction of the green filters. Thus, the transmissivity of the magenta strip varies with distance for both the red and the blue light being passed therethrough and produces an identical effect upon each primary color being passed. The methods described in FIGS. 6 and 7 are particularly suitable for the fabrication of these masks.

While the invention has been described with respect to certain specific embodiments, it will be appreciated that many modifications and changes may be made without departing from the spirit of the invention. I intend, therefore, by the appended claims, to cover all such modifications and changes as fall within the true spirit and scope of my invention.

What I claim as new and desire to secure by Letters Patent of the United States is:

1. In a system for producing a color image on a receiving surface characterized by a light modulating medium having diffraction gratings with parameters corresponding to different colors, a masking system having an output masking element with opaque sections and transparent sections for the selective passage therethrough of light rays diffracted by the medium, a light source for projecting a plurality of light beams upon said gratings, said light source, said light modulating medium and said masking system being disposed within an optical path at an attitude so that light beams passing undiffracted through said light modulating medium impinge upon said opaque sections of said output masking element to block said light beams from said receiving surface, the improvement comprising said output masking element having a nonlinear transparency distribution in transparent zones disposed parallel to and intermediate opaque sections for each primary color passed therethrough, said transparency distribution in said zones varying along the direction of diffraction produced by said gratings and increasing with distance from the edges of said opaque sections.

2. A projection system for producing a color image on a receiving surface according to claim 1 wherein said transparency distribution is proportional to a continuous geometric function symmetrically disposed relative to a plane orthogonal to said masking element and centrally positioned intermediate adjacent opaque sections.

3. A projection system for producing a color image on a receiving surface according to claim 1 wherein said output masking element has a light transmissivity varying in accordance with the formula $(1+\sin \theta)^2$.

4. A projection system for producing a color image on a receiving surface according to claim 1 wherein said output masking element has a transparency of at least 50 percent over approximately 33 percent of the masking element.

5. A system for producing a color image upon a receiving surface comprising a light source, means for modulating said light source with parameters corresponding to different colors, input light filter means disposed intermediate said light source and said modulating means for splitting light from said source into a plurality of beams, and output light filter means having transparent zones for selectively passing first order diffracted light of at least one primary color and opaque zones for blocking zero order diffracted light, said transparent zones characterized by a transparency distribution varying with distance from the edges of said opaque areas of said filter means along a direction corresponding to the direction of diffraction produced in light passing through said modulating means to produce substantially only zero and first order diffraction in the first order diffracted light of said primary color passing through said output light filter.

6. A system for producing a color image upon a receiving surface according to claim 5 including an input masking element having an opaqueness varying at an equal rate with the transparency distribution of said output masking element.

7. A system for producing a color image upon a receiving surface comprising a light source, means for modulating said light source with a parameter corresponding to a selected color, input light filter means disposed intermediate said light source and said modulating means for splitting light from said source into a plurality of parallel extending beams and output filter means having a plurality of parallel extending opaque sections for intercepting light from said source passing undiffracted through said modulating medium, said output filter means being further characterized by a plurality of parallel extending transparent sections centrally disposed intermediate said opaque sections for the selective passage of first order light therethrough with areas situated between said opaque sections and said transparent sections having an increasing transparency distribution with linear distance from the edges of said opaque sections for each primary color passing therethrough.

8. A system for the production of a color image upon a receiving surface according to claim 7 wherein said light mask has a transmission varying approximately according to the formula $(1+\sin \theta)^2$.

9. A system for the production of a color image upon a receiving surface comprising a light source, means for modulating said light source with a parameter corresponding to a selected color, input light filter means disposed intermediate said light source and said modulating means for splitting light from said source into a plurality of parallel extending beams and output filter means characterized by a plurality of parallel extending sections completely opaque to zero order diffracted light of at least one primary color and a plurality of sections transparent to a higher order diffracted light of said one primary color extending in a linear direction parallel to said opaque sections and disposed intermediate said opaque sections, said transparent sections having a transparency to said primary color which transparency increases with linear distance from the edges of said opaque sections.

10. A system for the production of a color image upon a receiving surface according to claim 9 wherein said mask has a light amplitude transmission corresponding to the formula $1+\sin \theta$.

11. A system for the production of a color image upon a receiving surface according to claim 9 wherein approximately 30 percent of said mask is completely opaque to said one primary color, said completely opaque portions of said mask corresponding to points of minimum light transmission in a mask having a light transmissivity varying according to the formula $(1+\sin \theta)^2$.

References Cited

UNITED STATES PATENTS

| | | |
|---|---|---|
| 2,813,146 | 11/1957 | Glenn. |
| 3,045,531 | 7/1962 | Prescott _____ 350—162 |
| 3,108,383 | 10/1963 | Gabor _____ 350—162 X |
| 3,216,318 | 11/1965 | Gaffard. |

OTHER REFERENCES

Murata: "Instruments for the Measuring of Optical Transfer Functions." In Progress in Optics, vol. V, edited by E. Wolf, published by North Holland Publishing Company, Amsterdam, 1966, pp. 199–213 relied on.

JOHN K. CORBIN, Primary Examiner

U.S. Cl. X.R.

178—5.4; 355—31, 97